(12) United States Patent
Oberai

(10) Patent No.: US 10,650,509 B2
(45) Date of Patent: May 12, 2020

(54) VIDEO OVERLAY

(71) Applicant: Synopsys, Inc., Mountain View, CA (US)

(72) Inventor: Ankush Bharati Oberai, Fremont, CA (US)

(73) Assignee: SYNOPSYS, INC., Mountain View, CA (US)

( * ) Notice: Subject to any disclaimer, the term of this patent is extended or adjusted under 35 U.S.C. 154(b) by 0 days.

(21) Appl. No.: 15/699,483

(22) Filed: Sep. 8, 2017

(65) Prior Publication Data

US 2018/0068428 A1    Mar. 8, 2018

Related U.S. Application Data

(60) Provisional application No. 62/385,213, filed on Sep. 8, 2016.

(51) Int. Cl.
*G06T 7/00* (2017.01)
*G06T 3/00* (2006.01)
*H04N 5/272* (2006.01)
*H04N 5/232* (2006.01)

(52) U.S. Cl.
CPC ............ *G06T 7/001* (2013.01); *G06T 3/0068* (2013.01); *G06T 2200/24* (2013.01); *G06T 2207/10016* (2013.01); *G06T 2207/30148* (2013.01); *H04N 5/23296* (2013.01); *H04N 5/272* (2013.01)

(58) Field of Classification Search
None
See application file for complete search history.

(56) References Cited

U.S. PATENT DOCUMENTS

| 7,194,709 B2 | 3/2007 | Brankner |
| 7,684,609 B1 | 3/2010 | Toth et al. |
| 7,752,594 B2 | 7/2010 | Takeda et al. |
| 8,057,049 B2 | 11/2011 | Nikaido |
| 8,095,895 B2 | 1/2012 | Leu |
| 9,251,581 B1 | 2/2016 | Chen et al. |
| 2011/0296362 A1 | 12/2011 | Ishikawa et al. |
| 2015/0213596 A1 | 7/2015 | Tandi |

OTHER PUBLICATIONS

Erington, K., Bodoh, D., Serrels, K. A., Nemirow, C., Leslie, N., Lundquist, T. R., . . . & Reid, D. T. (Jun. 2014). Measuring propagation delays of critical paths using time-resolved LADA. In 2014 IEEE International Reliability Physics Symposium (pp. 3F-4). IEEE. (Year: 2014).*

* cited by examiner

*Primary Examiner* — David Perlman
(74) *Attorney, Agent, or Firm* — Alston & Bird LLP

(57) ABSTRACT

A method includes automatically aligning a laser-based timing analysis image of a semiconductor device with an image of a layout of the device. The method further includes controlling a speed at which a multitude of images subsequently obtained by the laser-based timing analysis are compared to the layout of the device to create a video overlay. The method further includes analyzing a multitude of potential failures of the semiconductor device by detecting movements of a multitude of hotspots on the layout as shown by the video overlay.

20 Claims, 8 Drawing Sheets
(4 of 8 Drawing Sheet(s) Filed in Color)

VIDEO OVERLAY

CROSS-REFERENCES TO RELATED APPLICATIONS

This application claims priority, under 35 U.S.C. § 119(e), from U.S. Provisional Application No. 62/385,213, filed on Sep. 8, 2016, entitled "Video Overlay", the contents of all of which is incorporated herein by reference in its entirety.

BACKGROUND

During failure analysis of an integrated circuit (IC) chip, it is important to accurately identify the failing device or devices on the chip. Hence most FA tools provide marked areas that identify the potential failing devices in a dense layout of the chip, which is typically mounted in the FA tool for analysis. One conventional FA technique is the laser-assisted device alteration (LADA) technique, which creates time resolved images over a fixed field of view. These images have bright spots (hotspots) marking the potential problematic device locations. Users may view 100+ images at various time intervals. LADA technique works on all technology and will become increasingly important as Fin-FET's and conventional probing techniques phase out. The time resolved LADA technique scales with denser IC technology, while other probing techniques do not scale as well.

To overlay the set of images generated by the LADA technique with the layout, the user must align each image, or manually modify an image alignment file for the whole set of images, which is tedious. A need exists for a graphical user interface (GUI) to facilitate browsing through the images and to load the images in rapid succession (like a video). This will facilitate time based analysis of the potential failing devices.

FIG. 1 illustrates an embodiment of a failure analysis system 100 to conduct failure analysis on IC chips. The failure analysis system 100 comprises a user interface 102, a failure analysis tool 104, an IC chip 106, and a file system 108. The IC chip 106 is mounted in the failure analysis tool 104. The failure analysis tool 104 generates a set of images with hotspot markings indicating potential failing devices within the IC chip 106. The set of images is stored in the file system 108. The set of images may be displayed on the user interface 102 for failure analysis by an operator of the failure analysis system 100.

BRIEF SUMMARY

A video overlay system and process is disclosed that facilitates interaction with large numbers of images generated from the LADA technique. A user loads a set of images generated using the LADA technique and can play the images like a video. The user may align on one image file and apply an alignment matrix to the set of images. The user may step through each image frame with a manual slider bar, play through the set of images like a video, pause the video, and navigate forward or backward by picture frame. Using the hotspots from various images, the user can mark the critical areas. After marking the hotspots on the images manually, the user can activate a hotspot analyzer (e.g., Avalon) to locate common net(s) and crossmap the common net(s) (e.g, to IschemView) for further logical analysis. Nets flowing through multiple hotspots are potential killer nets.

A better understanding of the nature and advantages of the embodiments of the present invention may be gained with reference to the following detailed description and the accompanying drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

To easily identify the discussion of any particular element or act, the most significant digit or digits in a reference number refer to the figure number in which that element is first introduced.

DETAILED DESCRIPTION

Figure 1:
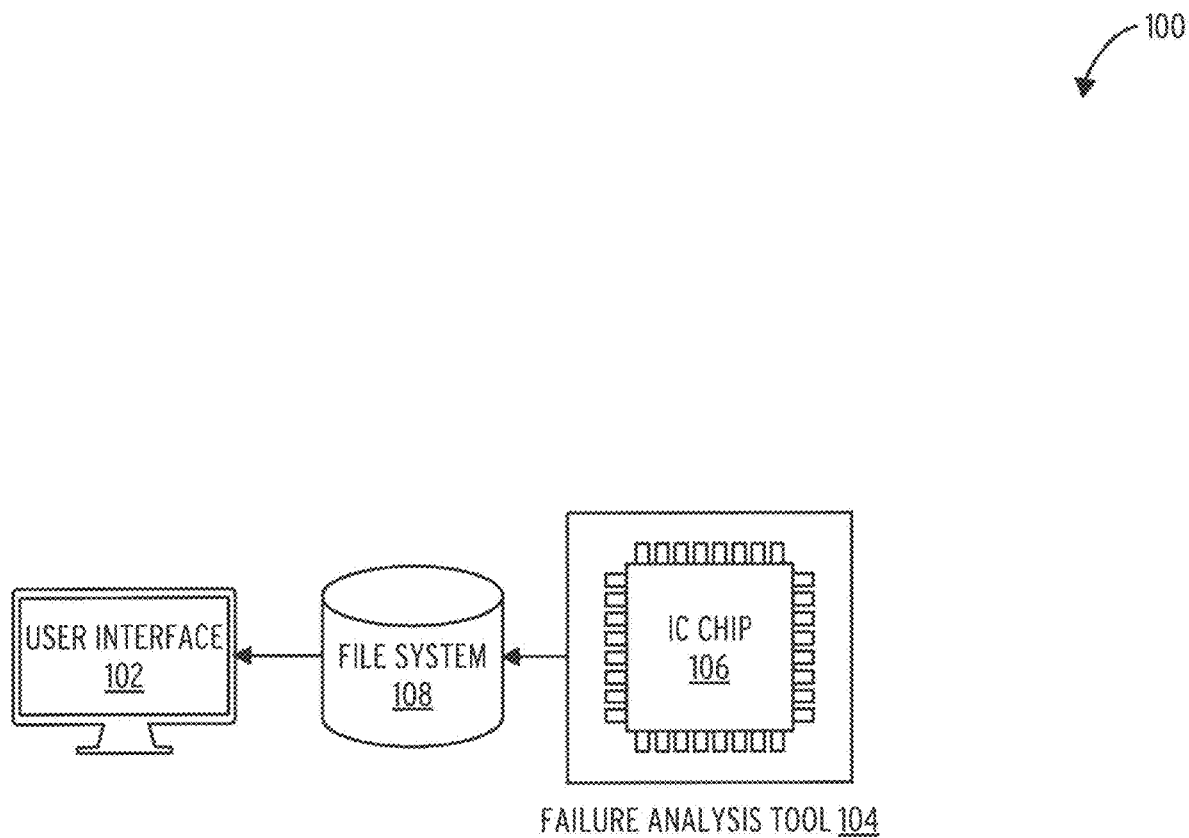
FIG. 1 illustrates an an embodiment of a failure analysis system.
Figure 2:
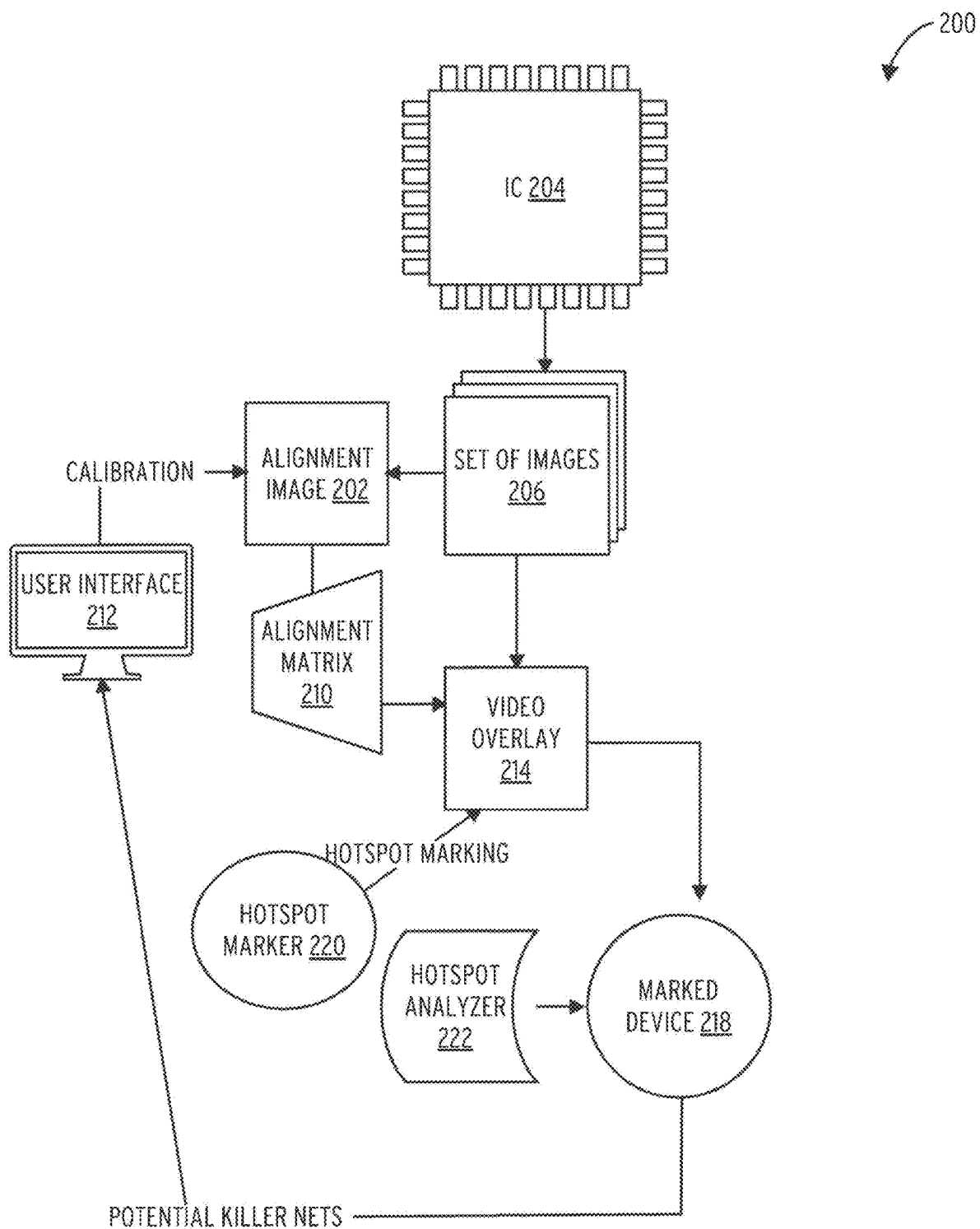
FIG. 2 illustrates an embodiment of a system for creation of video overlay for failure analysis.

FIG. 2 illustrates an embodiment of a system for creation of video overlay for failure analysis 200. The system for creation of video overlay for failure analysis 200 comprises an IC 204, a set of images 206, an alignment image 202, a user interface 212, an alignment matrix 210, a video overlay 214, a hotspot marker 220, a hotspot analyzer 222 and a marked device 218. The system for creation of video overlay for failure analysis 200 may be operated in accordance with the process 300 illustrated in FIG. 3.

Figure 3:
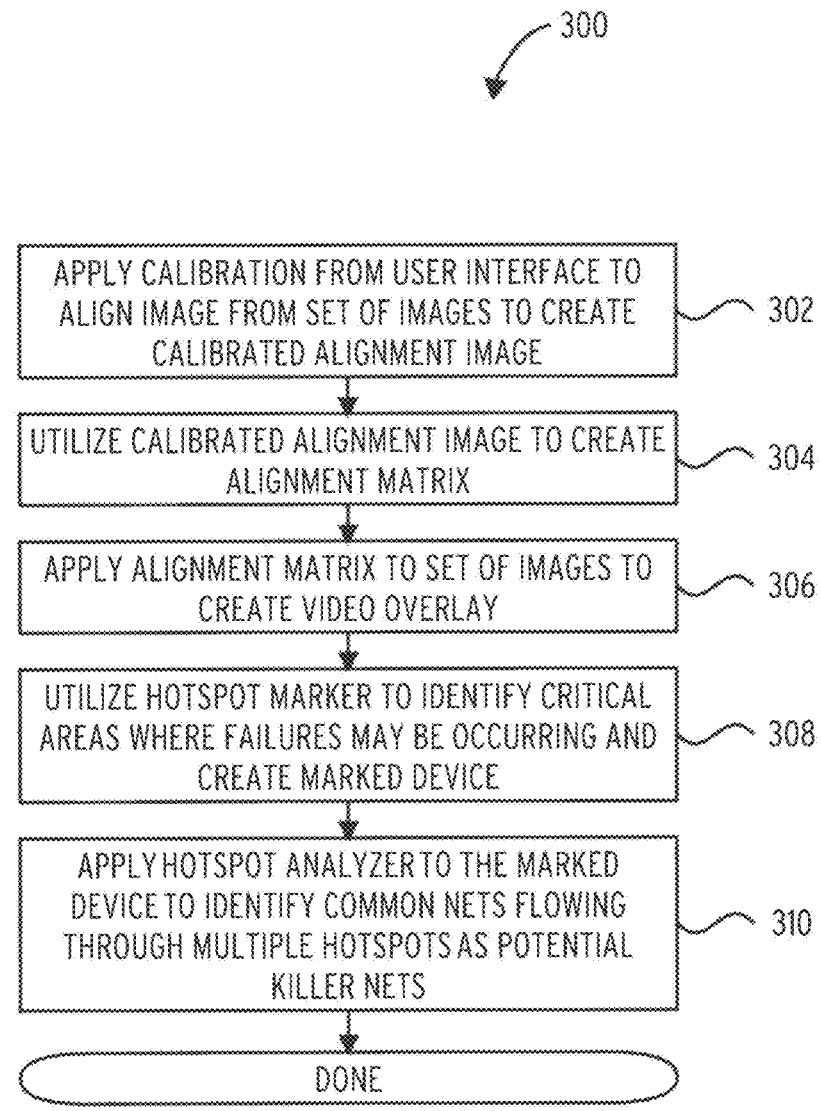
FIG. 3 illustrates a process in accordance with one embodiment.

Referring to FIG. 3, a calibration from a user interface is applied to align an image from a set of images to create a calibrated alignment image (block 302). The calibrated alignment image is utilized to create an alignment matrix (block 304). The alignment matrix is applied to the set of images to create a video overlay (block 306). A hotspot marker is utilized to identify critical areas where failures may be occurring and to create a marked device (block 308). A hotspot analyzer is applied to the marked device to identify common nets flowing through multiple hotspots as potential killer nets (block 310), and the process 300 concludes.

Figure 4:
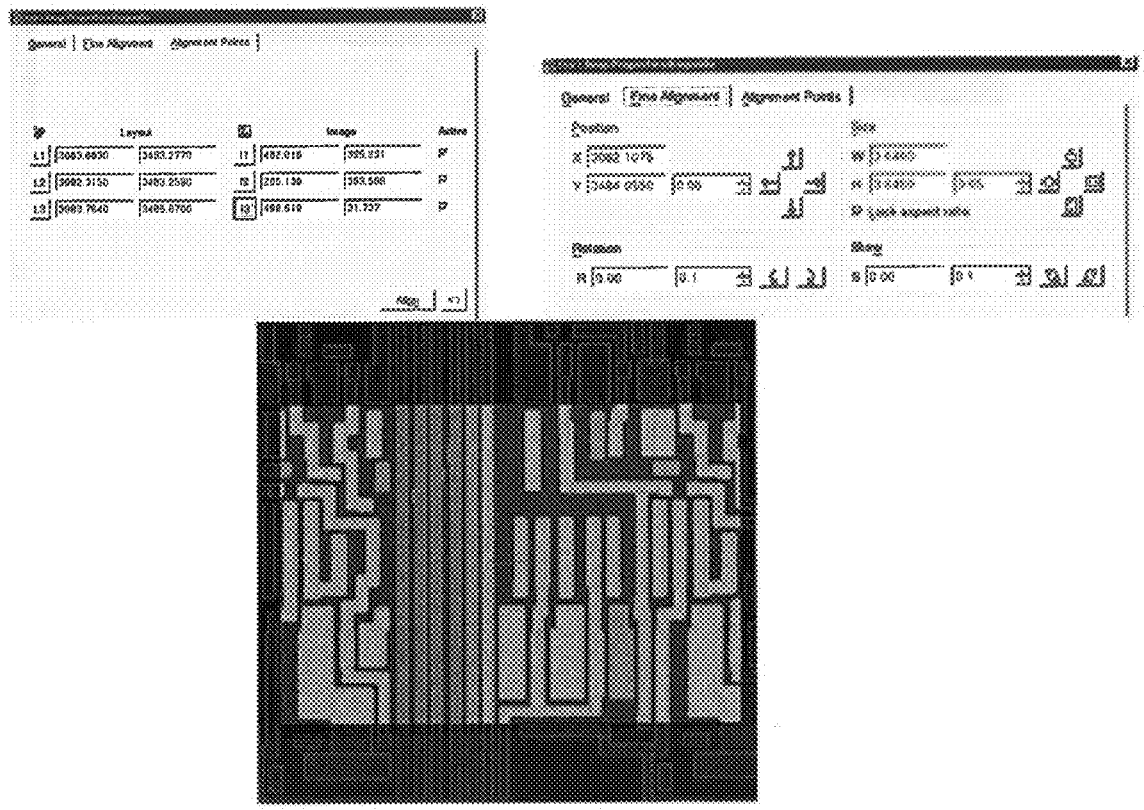
FIG. 4 illustrates an image alignment in accordance with one embodiment.

FIG. 4 shows how image alignment is achieved. The image alignment process may be a combination of manual and automatic alignment by the tool. Initially, user specifies one, two or three alignment points. Then the auto alignment capability of the tool aligns the image by comparing the layout structures. User can perform finer adjustments using the "Fine Alignment" tab as shown in FIG. 4.

Figure 5:
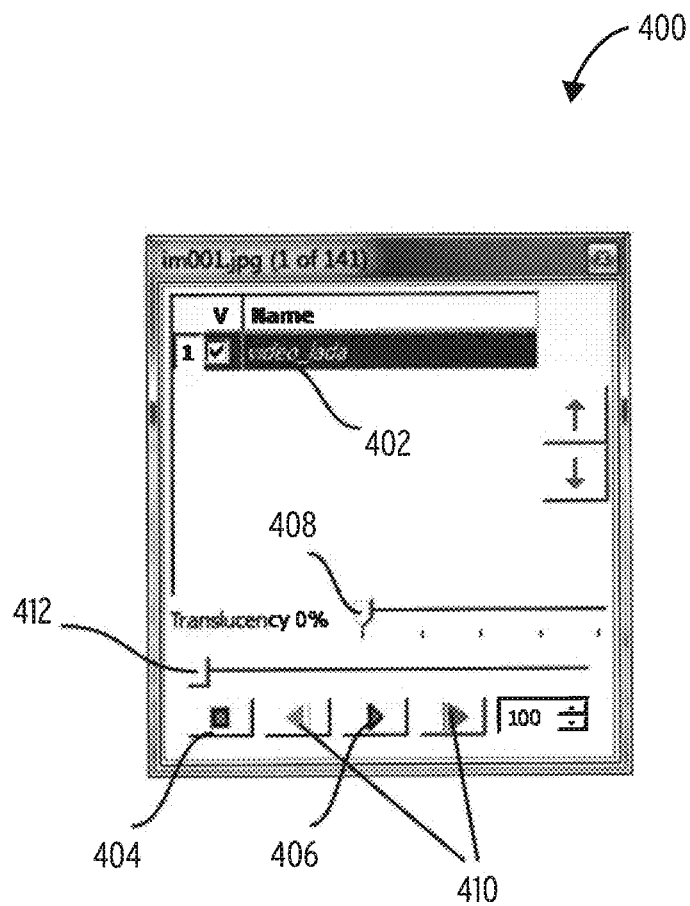
FIG. 5 illustrates an image list window in accordance with one embodiment.

Referring to FIG. 5, in one embodiment the system is implemented by adding a new menu item "Add video" to the Avalon tool MaskView. On invoking new menu item, the user is prompted to select a directory which stores the images for the video. After loading the directory, a new entry 402 is added in the image list window 400 for the active data set.

The user may load multiple such data sets in MaskView. A play button 406 and a pause button 404 enable the user to play or stop the video. A navigation slider control 412 enables the user to move forward and backward among the image frames in the video. Additionally, there are back and forward controls 410 to move backward and forward by one image frame. While video is playing, the user can pan or zoom on the image on the layout, and can use the translucency slider control 408 to affect the translucency of the video overlay images.

For video overlay, various logic modules of a GUI toolkit may be invoked to produce image processing modules. For example, the QImage, QPixmap, and QPainter of the Qt GUI toolkit may be utilized.

Images may be loaded and displayed (e.g, in Avalon) from a specified folder one after the other, with a delay configurable between 100 to 1000 milliseconds, for example configured using a spin-box. Each loaded image may be displayed on the main layout and the navigation slider control 412 updated to show progress through the sequence. This provides the feel of a video playing over the layout, with the hotspots appearing and disappearing along a time scale. This timing analysis may be critical for failure analysis. The play button 406 and the pause button 404 may be operated to control the process of loading the images.

Figure 6:
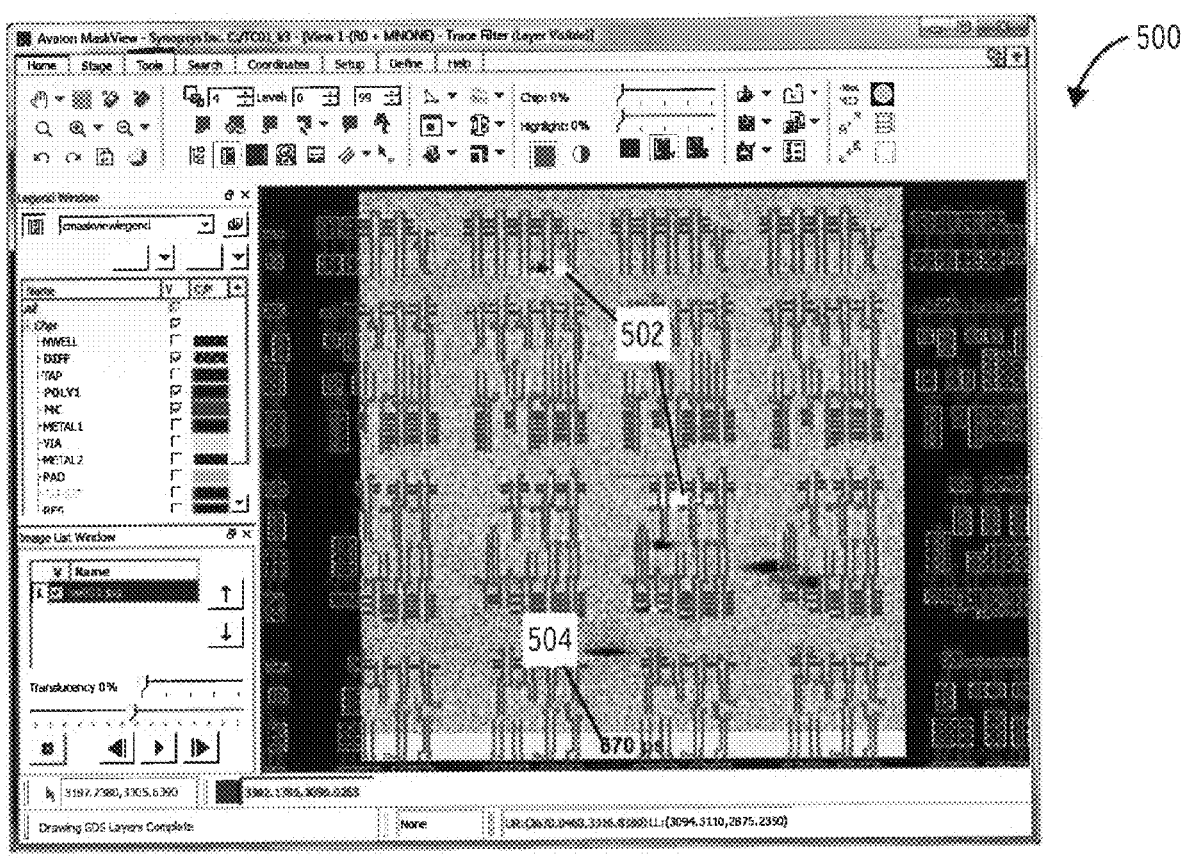
FIG. 6 illustrates a graphical user interface in accordance with one embodiment.

FIG. 6 illustrates an embodiment of a graphical user interface 500, in this example MaskView, running a video. Bright spots 502 mark the potential problematic devices. A timestamp 504 on the images helps the user perform time based analysis of devices shown as hotspots.

Figure 7:
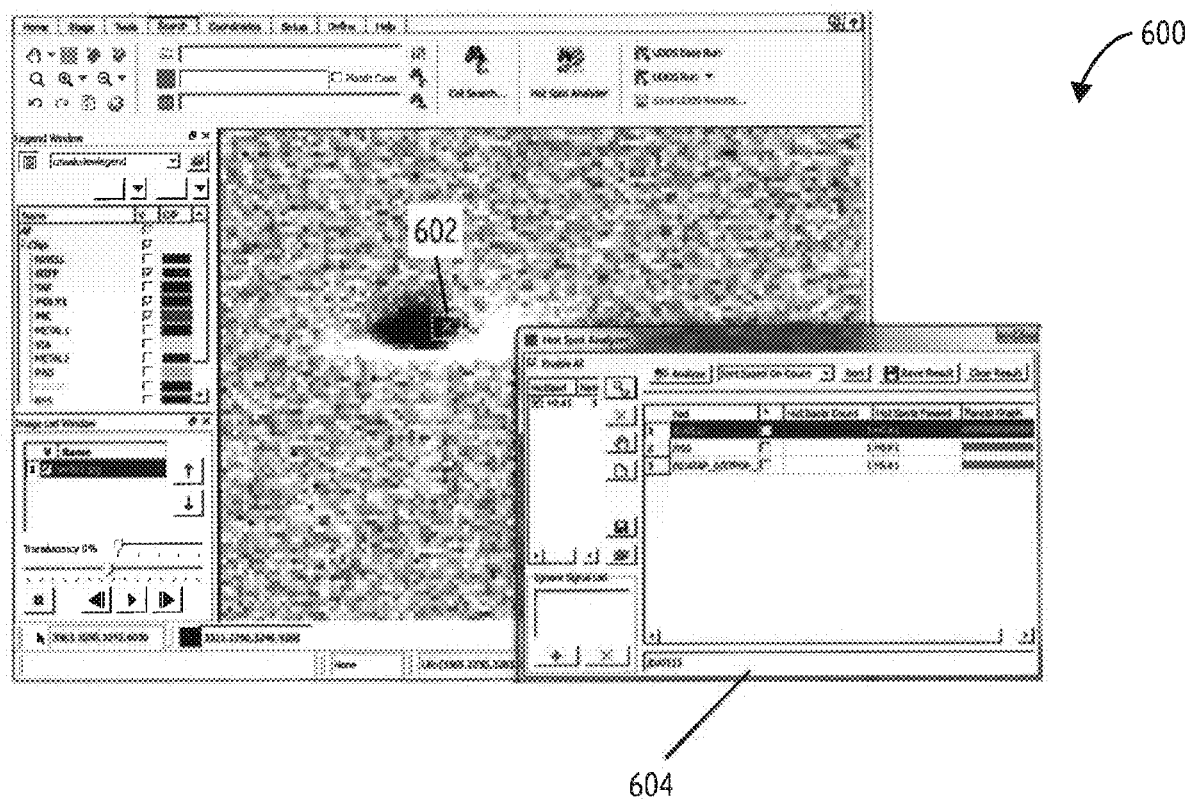
FIG. 7 illustrates a graphical user interface with marked device locations using yellow boxes and a hotspot analyzer window in accordance with one embodiment.

Referring to FIG. 7, a graphical user interface 600 includes marked device locations 602 using yellow boxes, and a hotspot analyzer window 604 that facilitates identification of a common net flowing across the marked devices.

Figure 8:
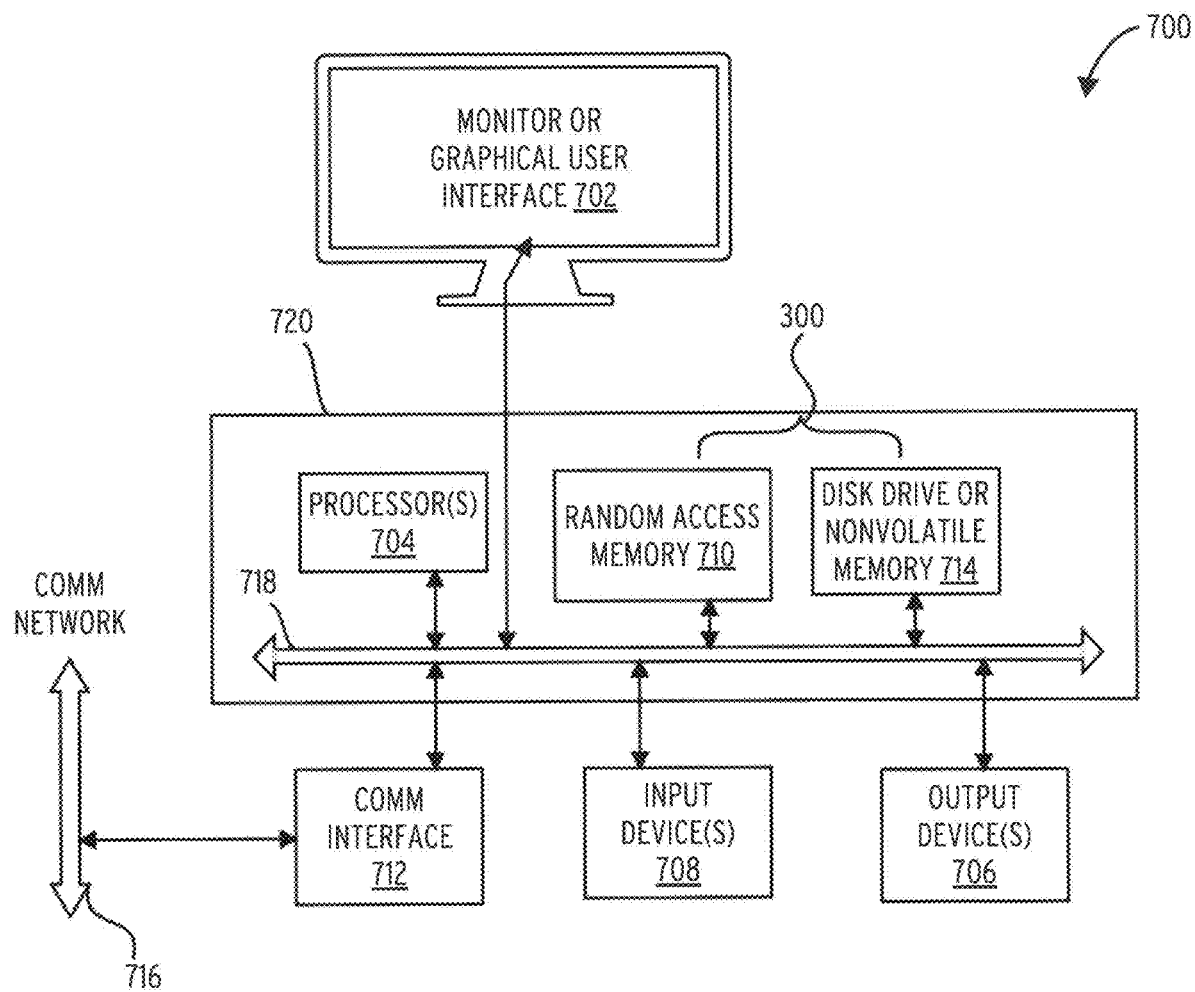
FIG. 8 is an example block diagram of a computer system that may incorporate embodiments of the present invention.

FIG. 8 is an example block diagram of a computer system 700 that may incorporate embodiments of the present invention. FIG. 8 is merely illustrative of a machine system to carry out aspects of the technical processes described herein, and does not limit the scope of the claims. One of ordinary skill in the art would recognize other variations, modifications, and alternatives. In one embodiment, the computer system 700 typically includes a monitor or graphical user interface 702, a computer 720, a communication network interface 712, input device(s) 708, output device(s) 706, and the like.

As depicted in FIG. 8, the computer 720 may include one or more processor(s) 704 that communicate with a number of peripheral devices via a bus subsystem 718. These peripheral devices may include input device(s) 708, output device(s) 706, communication network interface 712, and a storage subsystem, such as a random access memory 710 and a disk drive or nonvolatile memory 714.

The input device(s) 708 include devices and mechanisms for inputting information to the computer 720. These may include a keyboard, a keypad, a touch screen incorporated into the monitor or graphical user interface 702, audio input devices such as voice recognition systems, microphones, and other types of input devices. In various embodiments, the input device(s) 708 are typically embodied as a computer mouse, a trackball, a track pad, a joystick, wireless remote, drawing tablet, voice command system, eye tracking system, and the like. The input device(s) 708 typically allow a user to select objects, icons, text and the like that appear on the monitor or graphical user interface 702 via a command such as a click of a button or the like.

The output device(s) 706 include all possible types of devices and mechanisms for outputting information from the computer 720. These may include a display (e.g., monitor or graphical user interface 702), non-visual displays such as audio output devices, etc.

The communication network interface 712 provides an interface to communication networks (e.g., communication network 716) and devices external to the computer 720. The communication network interface 712 may serve as an interface for receiving data from and transmitting data to other systems. Embodiments of the communication network interface 712 typically include an Ethernet card, a modem (telephone, satellite, cable, ISDN), (asynchronous) digital subscriber line (DSL) unit, FireWire interface, USB interface, and the like. For example, the communication network interface 712 may be coupled to the communication network 716 via a FireWire bus, or the like. In other embodiments, the communication network interface 712 may be physically integrated on the motherboard of the computer 720, and may be a software program, such as soft DSL, or the like.

In various embodiments, the computer system 700 may also include software that enables communications over a network such as the HTTP, TCP/IP, RTP/RTSP protocols, and the like. In alternative embodiments, other communications software and transfer protocols may also be used, for example IPX, UDP or the like. In some embodiments, the computer 720 in the processor(s) 704 may include one or more microprocessors from Intel®. Further, one embodiment, the computer 720 includes a UNIX-based operating system.

The random access memory 710 and the disk drive or nonvolatile memory 714 are examples of tangible media configured to store data and instructions to implement various embodiments of the processes described herein, including executable computer code, human readable code, or the like. Other types of tangible media include floppy disks, removable hard disks, optical storage media such as CD-ROMS, DVDs and bar codes, semiconductor memories such as flash memories, non-transitory read-only-memories (ROMS), battery-backed volatile memories, networked storage devices, and the like. The random access memory 710 and the disk drive or nonvolatile memory 714 may be configured to store the basic programming and data constructs that provide the functionality of the disclosed processes and other embodiments thereof that fall within the scope of the present invention.

Software code modules and instructions that implement embodiments of the present invention may be stored in the random access memory 710 and/or the disk drive or nonvolatile memory 714. These software modules may be executed by the processor(s) 704. The random access memory 710 and the disk drive or nonvolatile memory 714 may also provide a repository for storing data used by the software modules.

The random access memory 710 and the disk drive or nonvolatile memory 714 may include a number of memories including a main random access memory (RAM) for storage of instructions and data during program execution and a read only memory (ROM) in which fixed non-transitory instructions are stored. The random access memory 710 and the disk drive or nonvolatile memory 714 may include a file storage subsystem providing persistent (non-volatile) storage for program and data files. The random access memory 710 and the disk drive or nonvolatile memory 714 may include removable storage systems, such as removable flash memory.

The bus subsystem 718 provides a mechanism for letting the various components and subsystems of computer 720 communicate with each other as intended. Although the communication network interface 712 is depicted schematically as a single bus, alternative embodiments of the bus subsystem 718 may utilize multiple busses.

FIG. 8 is representative of a computer system capable of implementing embodiments of the present invention. It will be readily apparent to one of ordinary skill in the art that many other hardware and software configurations are suitable for use with embodiments of the present invention. For example, the computer may be a desktop, portable, rack-mounted or tablet configuration. Additionally, the computer may be a series of networked computers. Further, the use of other microprocessors are contemplated, such as Pentium™ or Itanium™ microprocessors; Opteron™ or AthlonXP™ microprocessors from Advanced Micro Devices, Inc; and the like. Further, other types of operating systems are contemplated, such as Windows®, WindowsXP®, WindowsNT®, or the like from Microsoft Corporation, Solaris from Sun Microsystems, LINUX, UNIX, and the like. In still other embodiments, the techniques described above may be implemented upon a chip or an auxiliary processing board.

Various embodiments of the present invention may be implemented in the form of logic in software or hardware or a combination of both. The logic may be stored in a computer readable or machine-readable non-transitory storage medium as a set of instructions adapted to direct a processor of a computer system to perform a set of steps disclosed in embodiments of the present invention. The logic may form part of a computer program product adapted to direct an information-processing device to perform a set of steps disclosed in embodiments of the present invention. Based on the disclosure and teachings provided herein, a person of ordinary skill in the art will appreciate other ways and/or methods to implement the present invention.

The data structures and code described herein may be partially or fully stored on a computer-readable storage medium and/or a hardware module and/or hardware apparatus. A computer-readable storage medium includes, but is not limited to, volatile memory, non-volatile memory, magnetic and optical storage devices such as disk drives, magnetic tape, CDs (compact discs), DVDs (digital versatile discs or digital video discs), or other media, now known or later developed, that are capable of storing code and/or data. Hardware modules or apparatuses described herein include, but are not limited to, application-specific integrated circuits (ASICs), field-programmable gate arrays (FPGAs), dedicated or shared processors, and/or other hardware modules or apparatuses now known or later developed.

The methods and processes described herein may be partially or fully embodied as code and/or data stored in a computer-readable storage medium or device, so that when a computer system reads and executes the code and/or data, the computer system performs the associated methods and processes. The methods and processes may also be partially or fully embodied in hardware modules or apparatuses, so that when the hardware modules or apparatuses are activated, they perform the associated methods and processes. The methods and processes disclosed herein may be embodied using a combination of code, data, and hardware modules or apparatuses.

The above descriptions of embodiments of the present invention are illustrative and not limitative. In addition, similar principles as described corresponding to latches and/or flops can be applied to other sequential logic circuit elements. Other modifications and variations will be apparent to those skilled in the art and are intended to fall within the scope of the appended claims.

What is claimed:

1. A method comprising:
    automatically aligning a laser-based timing analysis image of a semiconductor device with an image of a layout of the device;
    controlling a speed at which a plurality of images subsequently obtained by the laser-based timing analysis are compared to the layout of the device to create a video overlay, said laser-based timing analysis being performed using a laser-assisted device alteration (LADA) technique; and
    analyzing a plurality of potential failures of the semiconductor device by detecting movements of a plurality of hotspots on the layout as shown by the video overlay.

2. The method of claim 1 further comprising:
    listing a plurality of nets of the layout associated with the identified plurality of potential failures.

3. The method of claim 1 further comprising:
    displaying a timestamp associated with the laser-based timing analysis on each one of the plurality of images.

4. The method of claim 1 further comprising:
    selecting which one of the plurality of images to start playing the video overlay.

5. The method of claim 1 further comprising:
    playing the video overlay forward by one of the plurality of images at a time.

6. The method of claim 1 further comprising:
    playing the video overlay backward by one of the plurality of images at a time.

7. The method of claim 1 further comprising:
    controlling a translucency of the video overlay compared to the layout of the device while the video is playing.

8. The method of claim 1 further comprising:
    panning to a location of the layout while the video is playing.

9. The method of claim 1 further comprising:
    zooming to an area of the layout while the video is playing.

10. The method of claim 1, wherein the speed is controlled in accordance with a time delay between one of the plurality of images and a successive image of the plurality of images in a range between 100 milliseconds and 1000 milliseconds.

11. A system for identifying a plurality of potential failures of a semiconductor device, the system configured to:
    automatically align a laser-based timing analysis image of the semiconductor device with an image of a layout of the device;
    control a speed at which a plurality of images subsequently obtained by the laser-based timing analysis are compared to the layout of the device to create a video overlay, wherein said laser-based timing analysis is performed using a laser-assisted device alteration (LADA) technique; and
    analyze a plurality of potential failures of the semiconductor device by detecting movements of a plurality of hotspots on the layout as shown by the video overlay.

12. The system of claim 11 further configured to:
    list a plurality of nets of the layout associated with the identified plurality of potential failures.

13. The system of claim 11 further configured to:
display a timestamp associated with the laser-based timing analysis on each one of the plurality of images.

14. The system of claim 11 further configured to:
select which one of the plurality of images to start playing the video overlay.

15. The system of claim 11 further configured to:
play the video overlay forward by one of the plurality of images at a time.

16. The system of claim 11 further configured to:
play the video overlay backward by one of the plurality of images at a time.

17. The system of claim 11 further configured to:
control a translucency of the video overlay compared to the layout of the device while the video is playing.

18. The system of claim 11 further configured to:
pan to a location of the layout while the video is playing.

19. The system of claim 11 further configured to:
zoom to an area of the layout while the video is playing.

20. The system of claim 11, wherein the speed is controlled in accordance with a time delay between one of the plurality of images and a successive image of the plurality of images in a range between 100 milliseconds and 1000 milliseconds.

* * * * *